United States Patent
Wilson-Jones et al.

(10) Patent No.: US 10,655,729 B2
(45) Date of Patent: May 19, 2020

(54) GEARBOX ASSEMBLY FOR AN ELECTRIC POWER STEERING ASSEMBLY

(71) Applicant: TRW Limited, Solihull, West Midlands (GB)

(72) Inventors: Russell Wilson-Jones, Stratford-upon-Avon (GB); Mark Anthony Wilkes, Birmingham (GB)

(73) Assignee: TRW Limited, Solihull, West Midlands (GB)

(*) Notice: Subject to any disclaimer, the term of this patent is extended or adjusted under 35 U.S.C. 154(b) by 175 days.

(21) Appl. No.: 15/742,062

(22) PCT Filed: Jul. 5, 2016

(86) PCT No.: PCT/GB2016/052024
§ 371 (c)(1),
(2) Date: Jan. 5, 2018

(87) PCT Pub. No.: WO2017/006106
PCT Pub. Date: Jan. 12, 2017

(65) Prior Publication Data
US 2018/0202538 A1   Jul. 19, 2018

(30) Foreign Application Priority Data

Jul. 6, 2015 (GB) .................................. 1511826.8

(51) Int. Cl.
*F16H 57/12* (2006.01)
*F16H 55/24* (2006.01)
(Continued)

(52) U.S. Cl.
CPC ........... *F16H 57/12* (2013.01); *B62D 5/0409* (2013.01); *F16C 19/16* (2013.01); *F16H 1/16* (2013.01);
(Continued)

(58) Field of Classification Search
CPC .... B62D 5/0409; F16C 19/16; F16C 2361/61; F16H 1/16; F16H 55/24; F16H 57/022;
(Continued)

(56) References Cited

U.S. PATENT DOCUMENTS 7,721,616 B2 * 5/2010 Augustine ................. F16H 1/16
   74/352
2004/0163879 A1 * 8/2004 Segawa ................. B62D 5/0409
   180/444

(Continued)

FOREIGN PATENT DOCUMENTS

DE   102008001878 A1   11/2009
DE   102009018674 A1   10/2010
(Continued)

OTHER PUBLICATIONS

Patent Act 1977: Search Report under Section 17(5), Application No. GB1511826.8, dated Jan. 7, 2016.
(Continued)

*Primary Examiner* — Victor L MacArthur
*Assistant Examiner* — Joseph Brown
(74) *Attorney, Agent, or Firm* — MacMillian, Sobanski & Todd, LLC

(57) ABSTRACT

A gearbox assembly for an electric power assisted steering apparatus comprises a gearbox housing which houses a worm shaft and a gear wheel, the worm shaft being supported relative to the housing by a main bearing assembly at an end closest to the motor and by a tail bearing assembly at an end furthest from the motor. The main bearing assembly comprises an inner race and an outer race separated by bearing elements, the outer race being supported by a carrier that is supported by an axle that is in turn secured to gearbox housing, the axle defining a pivot axis for the worm shaft that is located on the side of the worm shaft closest to the (Continued)

wheel gear and extends in a direction orthogonal to the axis of the worm shaft and parallel to the axis of the wheel gear.

8 Claims, 5 Drawing Sheets

(51) Int. Cl.
 *B62D 5/04* (2006.01)
 *F16C 19/16* (2006.01)
 *F16H 1/16* (2006.01)
 *F16H 57/022* (2012.01)
 *F16H 57/021* (2012.01)
 *F16H 57/039* (2012.01)

(52) U.S. Cl.
 CPC ............ *F16H 55/24* (2013.01); *F16H 57/022* (2013.01); *F16C 2361/61* (2013.01); *F16H 57/039* (2013.01); *F16H 2057/0213* (2013.01); *F16H 2057/0222* (2013.01); *F16H 2057/126* (2013.01); *F16H 2057/127* (2013.01)

(58) Field of Classification Search
 CPC .................. F16H 57/039; F16H 57/12; F16H 2057/0213; F16H 2057/0222; F16H 2057/126; F16H 2057/127
 USPC ........................................................ 74/388 PS
 See application file for complete search history.

(56) References Cited

U.S. PATENT DOCUMENTS

| | | | | |
|---|---|---|---|---|
| 2008/0041178 A1* | 2/2008 | Ozsoylu | ................ | F16H 55/24 74/425 |
| 2009/0314114 A1* | 12/2009 | Grosberg | ................ | F16H 55/24 74/409 |
| 2010/0140011 A1* | 6/2010 | Wilkes | ................ | B62D 5/0409 180/444 |
| 2011/0155499 A1* | 6/2011 | Wilkes | ................ | B62D 5/0409 180/444 |
| 2012/0125132 A1* | 5/2012 | Bernhard | ............ | B62D 5/0409 74/89.14 |
| 2012/0272765 A1* | 11/2012 | Fuechsel | ............. | B62D 5/0409 74/416 |
| 2013/0025960 A1* | 1/2013 | Hama | ................. | B62D 5/0409 180/444 |
| 2014/0029884 A1* | 1/2014 | Toyama | ............... | B62D 5/0409 384/490 |
| 2015/0040707 A1* | 2/2015 | Hong | .................... | H02K 7/081 74/425 |
| 2015/0197277 A1* | 7/2015 | Mehl | ...................... | F16H 55/24 180/444 |
| 2016/0031473 A1* | 2/2016 | Riepold | .............. | B62D 5/0409 74/425 |
| 2016/0097424 A1* | 4/2016 | Hafermalz | ........... | F16H 57/039 74/425 |
| 2016/0101808 A1* | 4/2016 | Tomizawa | .............. | F16H 55/24 180/444 |
| 2016/0121921 A1* | 5/2016 | Schonlechner | ...... | B62D 5/0409 180/444 |
| 2017/0050667 A1* | 2/2017 | Strobel | ................ | B62D 5/0409 |

FOREIGN PATENT DOCUMENTS

| | | | |
|---|---|---|---|
| EP | 1795778 A1 | 6/2009 | |
| JP | H02220969 A | 9/1990 | |
| JP | 2006298300 A | 11/2006 | |
| WO | WO-2012081690 A1 * | 6/2012 | ........... B62D 5/0409 |

OTHER PUBLICATIONS

PCT International Search Report and the Written Opinion, Application No. PCT/GB216/052024 filed Jul. 5, 2016, dated Oct. 19, 2016.

* cited by examiner

GEARBOX ASSEMBLY FOR AN ELECTRIC POWER STEERING ASSEMBLY

CROSS-REFERENCE TO RELATED APPLICATIONS

This application is a national stage of International Application No. PCT/GB2016/052024, filed 5 Jul. 2016, the disclosures of which are incorporated herein by reference in entirety, and which claimed priority to Great Britain Patent Application No. 1511826.8, filed 6 Jul. 2015, the disclosures of which are incorporated herein by reference in entirety.

BACKGROUND OF THE INVENTION

This invention relates to gearbox assemblies for electric power steering assemblies of the worm and wheel type.

Electric power steering systems use an electric motor to produce an assistance torque that is applied to a rotating part of the steering system. In a conventional arrangement this torque assists the driver in turning the wheel. Because motors work best at relatively high speeds and because compact motors produce relatively low torques, the connection between the output of the motor and the steering column is usually through a reduction gearbox.

The most widely used type of electric power assisted steering reduction gearboxes are of a relatively simple worm and gear configuration. The gearbox assembly typically comprises a gearbox housing which houses a worm shaft and a gear wheel. The worm shaft is connected to the output of an electric motor (shown in part at the far right). The motor may be secured to an end face of the housing or even located within the housing. The worm shaft is supported by a main bearing assembly at an end closest to the motor and a tail bearing assembly at an end furthest from the motor, both bearing assemblies typically comprising ball bearing elements supported within an inner bearing race that is threaded onto the worm shaft and an outer bearing race that is secured to the housing. The function of the bearings assemblies is to allow the worm shaft to rotate whilst to a certain degree limiting axial and radial movement as will be explained. The gear wheel is connected to an output shaft of the gearbox and located so that teeth of the gear wheel engage teeth of the worm shaft.

It is known that the speed reduction gearboxes used in Electrical Power-assisted Steering (EPS) apparatus are prone to rattle due to external torsional vibrations acting at their output shafts. These vibrations originate at the road wheels due to surface roughness or unbalanced wheels. Alternatively, mechanical noise can arise from sudden torque reversals applied at the steering wheel by the driver. The main rattle sites in a worm and wheel gearbox are at the engagement of the worm and gear teeth and at the "main" ball bearing, closest to the motor, which axially locates the worm shaft.

A well-known solution to the rattle is the so-called "Sprung Worm" mechanism. In the "Sprung Worm" mechanism, a biasing means such as a leaf spring applies a biasing force that urges the worm shaft into engagement with the wheel gear. The biasing means requires a small amount of radial movement of the worm shaft and this is achieved by allowing it to pivot around its axis in the plane of the gearwheel by a small angle (typically less than +/−0.5 degrees) either side of its nominal position. The pivoting is normally around an axis which is nominally at the centre of the main bearing. This movement is typically controlled by a specially configured tail bearing that is allowed to move by small amounts (typically less than +/−0.5 mm) and typically by the main bearing having sufficient internal axial clearance between its balls and the sides of its race grooves to permit a small articulation (i.e. tilting) angle which is typically less than +/−0.5 degrees.

BRIEF SUMMARY OF THE INVENTION

A feature of the present invention is to ameliorate problems that have been identified by the applicant in prior art gearbox assemblies associated with the need to enable the worm shaft to pivot.

According to a first aspect the invention provides a gearbox assembly for an electric power assisted steering apparatus comprising:

a gearbox housing which houses a worm shaft and a gear wheel, the worm shaft being supported relative to the housing by a main bearing assembly at an end closest to the motor and by a tail bearing assembly at an end furthest from the motor, and the gear wheel being supported by an output shaft having at least one end that provides a take-off from the gearbox assembly, in which the tail bearing assembly is free to move relative to the housing through a limited range of motion that enables the worm shaft to move radially away from the axis of the wheel gear, and further including a biasing means that applies a biasing force to the tail bearing assembly that biases the worm shaft into engagement with the wheel gear, characterised in that the main bearing assembly comprises an inner race and an outer race separated by bearing elements, the outer race being supported by a carrier that is supported by an axle that is in turn secured to gearbox housing, the axle defining a pivot axis for the worm shaft that is located on the side of the worm shaft closest to the wheel gear and extends in a direction orthogonal to the axis of the worm shaft and parallel to the axis of the wheel gear, the axle comprising a first portion that is secured to the gearbox housing so that the first portion is free to rotate around the pivot axis but is prevented from moving radially, and further comprising a second portion that is offset along the pivot axis from the first portion and is secured to the gearbox housing in such a way that it is prevented from moving axially, rotationally and radially, the first portion and second portion being connected by a third portion that is able to twist when a torsion is applied by the first and second portions whilst restraining relative axial movement of the first and second portions, and further in that a first part of the carrier is fixed to the first portion of the axle so that it is prevented from rotating relative to the first portion of the axle whereby in use radial movement of the main bearing is constrained by the axle whilst pivoting movement of the carrier about the axle is achieved through twisting of the first portion of the axle relative to the fixed second portion of the axle.

The gearbox assembly may be arranged so that a second portion of the carrier is supported by the second portion of the axle so that the carrier is free to rotate relative to the second portion.

The axle may comprise a single generally rigid but torsionally flexible shaft, the first and second ends of the shaft sharing a common axis of rotation. The shaft should be able to resist bending and be generally inextensible when subject to any loads that would normally be present during use of the gearbox.

The axle may comprise an elongate wire torsion spring with the first portion, second portion and the third portion comprising spaced portions along the wire. The first and second portions may comprise the ends of the wire and the third-middle-portion may function as a torsion bar. The torsion spring may be relatively inextensible so that for any forces applied to the first end that arise during normal use of the gearbox assembly the axle will not stretch by a significant amount. This ensures that the anchoring of the second end against axial movement also provides effective anchoring of the first end, which would not be possible if the two ends were not adequately connected.

The wire may comprise a single strand, for example a solid strand, but it may be hollow and may comprise of multiple strands. The wire may comprise a singles strand having a diameter of between 1 mm and 10 mm and may be spring steel or other suitable elastic material. The diameter will depend on the active length of the spring for any given desired spring rate.

The wire spring may comprise a metal wire and may comprise a single elongate wire for ease of manufacture.

The first portion of the axle may be located on the opposite side of the wheel gear from the second portion of the axle. These portions may therefore be located on opposing sides of the worm shaft axis.

The first and second portions of the axle may be spaced apart by a distance that is greater than the width of the main bearing assembly. The greater the distance, the longer the effective length of the third portion—the torsion bar, and hence the lower the torsional stiffness of the spring for a given cross section of the axle.

The torsion bar may have a spring rate and apply a preload (e.g. the load when the bearing is in a neutral position) that combines with any additional spring provides adequate biasing force to the wormshaft/gear wheel interface to prevent or substantially prevent rattle in the gears.

Where no additional biasing spring is provided, the torsion bar may be primary source of biasing force applied to the worm shaft.

It is preferred that the torsion bar has a spring rate that is low enough to avoid any large variation in the biasing force applied to the worm shaft/wheel gear interface due to component tolerances, wear, and temperature.

The first end of the axle may be secured to an inner race of a bearing assembly with the outer race of the bearing assembly being secured to the gearbox housing. The bearing assembly may comprise a needle bearing assembly with the inner and outer races separated by needle bearings. The bearing assembly that supports the first portion may have zero, or substantially zero, clearance. The bearing assembly may not provide any meaningful resistance to axial movement of the first portion of the axle, this movement being primarily restrained at the second end of the axle.

The carrier may be fixed to the inner race, for instance by press fit of the inner race into a recess in the carrier.

The second end of the axle may comprise a finger that extends radially away from the axis of the axle and is secured to the gearbox housing. The end of the finger may be received in a recess in the gearbox housing. The finger may be formed by bending of the terminal end of the wire out of the plane of the rest of the wire.

The carrier may be secured to the axle at the point near the second end of the axle by providing a square bush around the axle that is located in a corresponding square hole in the carrier such that the bush can move a little in the hole during movement of the worm to restrain movement of the carrier in a direction orthogonal to the worm axis in the plane of the wheel gear whilst permitting some movement in the direction of the worm axis.

The carrier is preferably supported by the axle in a location that is at or adjacent the finger.

The worm shaft may be supported by the tail bearing assembly such that the tail bearing provides the primary constraint on any pivoting of the worm shaft from side to side, i.e. in a plane lying in the Z direction as shown in the accompanying drawings. The other constraint on this movement is provided by the connection between the second end of the axle and the gearbox housing. This motion may generally comprise a pivoting movement around an axis defined by connection between the first portion of the carrier and the housing.

The main bearing assembly may comprise an annular bearing comprising an inner bearing race connected to the worm shaft and an outer bearing race secured to the carrier, the inner and outer races being free to rotate relative to a common axis coincident with the axis of the worm shaft by bearings that are located in tracks in each of the races.

The main bearing assembly may have zero, or substantially zero, clearance.

The use of the torsionally deformable pivot axle, for example a simple elongate torsion spring, permits the worm shaft to swing in the plane of the gear wheel around a pivot centre which is closer to the main bearing assembly than to the tail bearing assembly. The assembly provides little, if any, lash yet provides secure location with a greatly reduced risk of any rattle occurring.

The gearbox assembly may comprise a part of an electric power assisted steering apparatus. Therefore, in another aspect the invention may provide an electric power assisted steering apparatus comprising a gearbox of the first aspect, the gearwheel being connected to a shaft that is connected to a steering shaft that is connected mechanically to a steering wheel of the vehicle, the motor in use applying an assistance torque to the shaft in response to a signal indicative of the torque applied to the steering shaft by a driver turning the steering wheel.

Other advantages of this invention will become apparent to those skilled in the art from the following detailed description of the preferred embodiments, when read in light of the accompanying drawings.

DETAILED DESCRIPTION OF THE INVENTION

Figure 1:
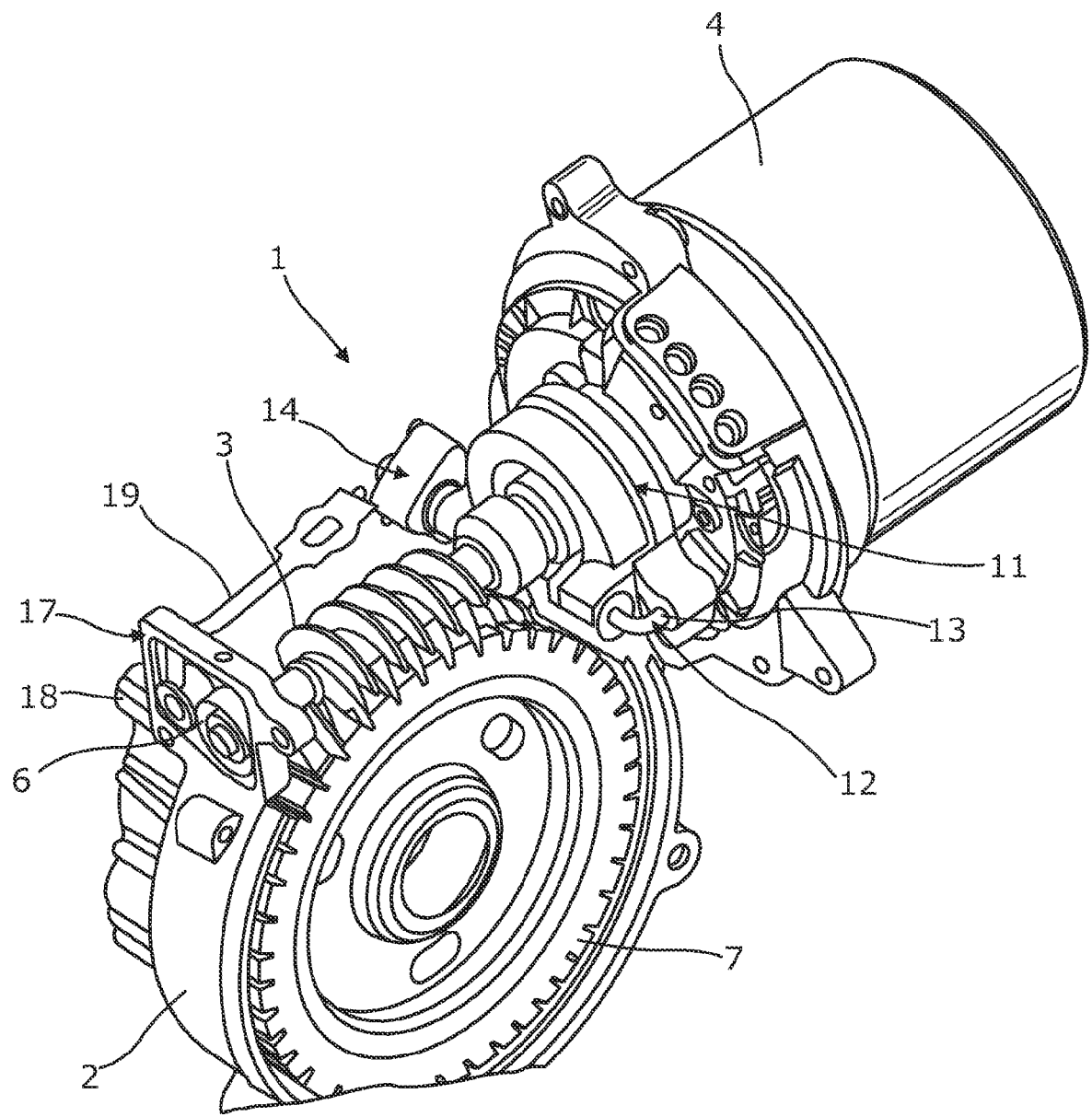
FIG. 1 is a perspective view of a part of the gearbox assembly of FIG. 1 in which the gearbox housing is cut away to reveal the internal components of the gearbox.

FIGS. 1 through 5 illustrate an embodiment of a gearbox assembly 1 in accordance with an aspect of the Invention that can be incorporated into an electric power assisted steering apparatus. In use the gearbox assembly 1 provides a geared reduction in the output of an electric motor of the steering apparatus, allowing torque generated by the motor to be transferred to the steering column or rack (or other part of the steering system), the torque assisting the driver to turn the wheel or providing the principle source of steering torque.

The gearbox assembly 1 comprises a gearbox main housing casing 2 which houses a worm shaft 3 connected to the rotor of an electric motor 4 through a pin and a torque-transmitting coupler. The worm shaft 3 comprises an elongate shaft that carries a worm gear. The shaft 3 is supported by a main bearing assembly 5 (visible only in FIG. 4 of the drawings) at the side of the worm that is closest to the motor 4 and by a tail bearing assembly 6 at an end of the shaft 3 furthest from the motor 4. Both bearing assemblies 5, 6 comprise an annular inner race that is threaded onto the shaft 3 and an annular outer race supported by the housing, with a set of ball bearings connecting the inner race to the outer race. As will be described both the bearing assemblies are able to move, in use, by a small amount relative to the housing 2 as torque is applied to the gearbox assembly 1.

The worm is connected to a gear wheel 7 that is also housed in the housing 2. The wheel 7 is supported on an output shaft 8 (shown in FIG. 5), the two ends 9, 10 of which are accessible from outside of the gearbox. One end 9 of the output shaft 8 is connected to the steering shaft and onwards to the steering wheel (not shown), and the other end 10 of the output shaft 8 is connected to the steering rack and onwards to the road wheels. The output shaft 8 therefore provides a mechanical path directly from the steering wheel to road wheels in this example and the gear wheel transfers torque from the motor to the output shaft to assist the driver.

The gear wheel 7 and worm gear each have complimentary teeth that are meshed and may be in a single contact or double contact condition. In the former, each worm tooth that is engaged with the worm wheel at a given instant in time will contact at most only a single gear wheel tooth, and in the later condition at least one worm tooth will be in contact with the flanks of two gear wheel teeth at a given instant in time.

The main bearing assembly 5 and tail bearing assembly 6 prevent axial movement of the worm shaft 3 and allow pivoting of the worm shaft. To avoid rattle both bearing assemblies should have minimal free play between the inner and outer races for both radial and axial movement. The manner in which the bearings are supported relative to the housing 2 will now be described.

Figure 4:
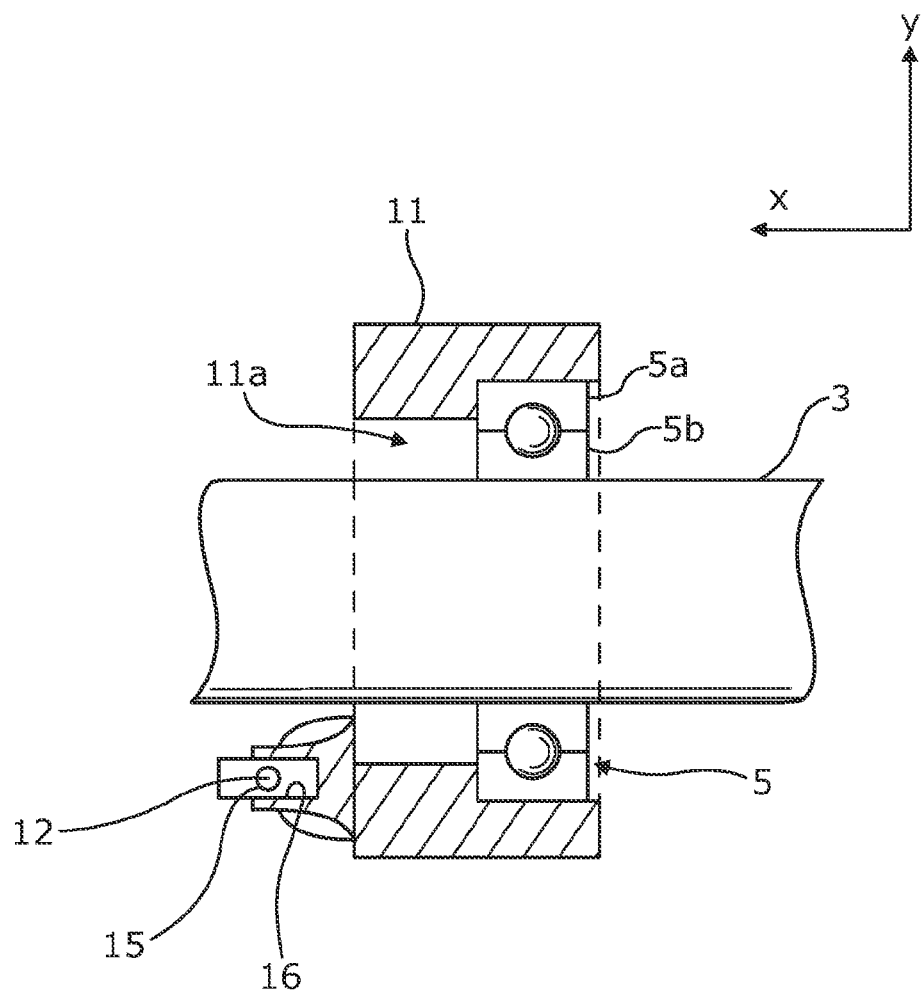
FIG. 4 is an alternative cross section view of the carrier showing the location of the main bearing and the pivot axle.
Figure 5:
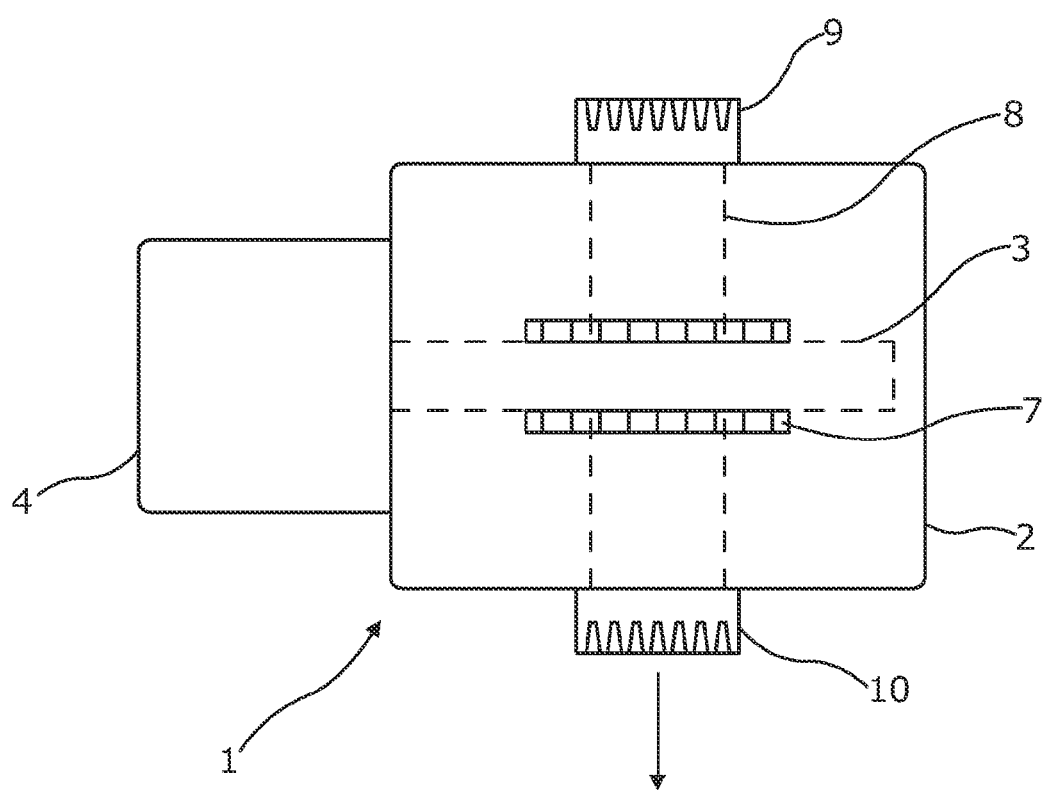
FIG. 5 shows the gearbox assembly with the housing cut away to reveal the wheel gear and worm gear.

The main bearing assembly 5 is located in a carrier 11, which in this example is solid metal casting but could be a plastic moulded part. The carrier 11 comprises a generally ring shaped main body having a hole 11a that extends through its centre that the worm shaft 3 passes through. The side walls of this hole are sized to receive the main bearing assembly 5, with the outer race 5a of the main bearing assembly being a press fit into the hole. This is shown in FIG. 4. The inner race 5b of the main bearing is pressed onto the worm shaft 3. The worm shaft 3 is therefore free to rotate within the carrier 11. The main bearing assembly 5 may have zero clearance, meaning that there is no radial or axial free play between the inner and outer bearing races.

The carrier 11 is secured to the main gearbox housing 2 and provides the support of the worm shaft at the motor end. As can be seen in FIGS. 1 to 4, this support is provided by a torsion spring 12 that forms a pivot axle. The axis of this pivot axle is located below the worm shaft as shown, by which we mean it is located between the worm shaft axis and the wheel gear axis. The pivot axis is orthogonal to the worm shaft axis, and parallel to the wheel gear axis.

The axle in this embodiment is an elongate wire torsion spring 12 that is bent at one end to form a short finger 13. The first end of the wire—being the one without the finger is supported in a needle bearing 14 that is anchored to the gearbox housing 2 on one side of the wheel gear. This bearing comprises an inner race 14a fixed to the first end of the wire 12 so that the wire cannot rotate relative to the inner race. The outer race 14b is secured to the gearbox housing. Needle bearings separate the two races. This supports the first end of the torsion spring 12.

The finger 13 at the second end of the wire is located in a hole in a bush 15 that is pressed fitted into a hole in the gearbox housing 2 on a second side of the gear wheel. This supports the second of the torsion spring 12.

The carrier 11 is secured to the torsion spring 12 at two spaced locations, and is otherwise not secured to the main housing 2. It is secured in two places; at the first end of the spring and at the second end. It is not secured to the spring at any point between these two locations.

At the first end of the spring 12 the carrier 11 is a press fit onto the inner race 14a of the needle roller bearing 14. The carrier 11 cannot therefore rotate relative to the inner race 14a and hence cannot rotate relative to the first end of the torsion spring 12. In practice any tilting of the carrier will create a torsional load that causes the first end of the spring 12 to rotate around its axis. Because the second end of the spring 12 cannot move due to the finger 13 being secured to the gearbox housing 2, this movement of the first end will cause the spring to twist along its length.

The connection of the carrier 11 to the second end of the spring 12 is achieved using a bush 15 that is threaded onto the second end of the spring 12. The bush 15 has a square outer profile, and is slid into a corresponding square recess 16 in the carrier 11. The bush 15 is therefore free to move a little in and out of the recess, which will happen if the worm shaft moves a little from side to side, for instance due to tolerances during assembly. Of course, it is possible for the connection between the carrier 11 and the second end of the spring 12 to be arranged to prevent such movement. Notably the carrier 11 must be free to rotate relative to the second end of the wire 12 as the carrier pivots, because the second of spring cannot rotate. In this example the free movement is achieved by the bush 15 rotating around the spring 12, but it is possible that the bush 15 could rotate within the recess 16 in the carrier 11.

In use, as the worm shaft 3 pivots, the first end of the torsion wire 12 will rotate in the needle bearing assembly 14. This will produce torsion in the wire spring 12, especially in the middle portion of the spring which acts as torsion bar. The needle bearing assembly 14 resists forces on the worm in the direction X and Y as shown in the figures, but does not and in this case cannot resist loads in the z direction as shown in the figures.

On the other hand the torsion wire 12 is anchored to the gearbox housing 2 in such a manner that it resists the loads in the Z direction and in the embodiment shown also in the Y direction. Resisting in the Y direction at the second end ensures any movement that may otherwise be possible due to coning of the roller bearing assembly is resisted.

The connection of the carrier 11 to the gearbox housing 2 in the example shown does permit some movement in the X direction at the second end of the torsion spring, and any coning of the needle bearing would also permit some movement in this direction centred on an axis that passes through the needle bearing 14, but the resulting movement of the worm shaft 3 can be conveniently controlled by appropriate support of the tail bearing 6.

Figure 2:
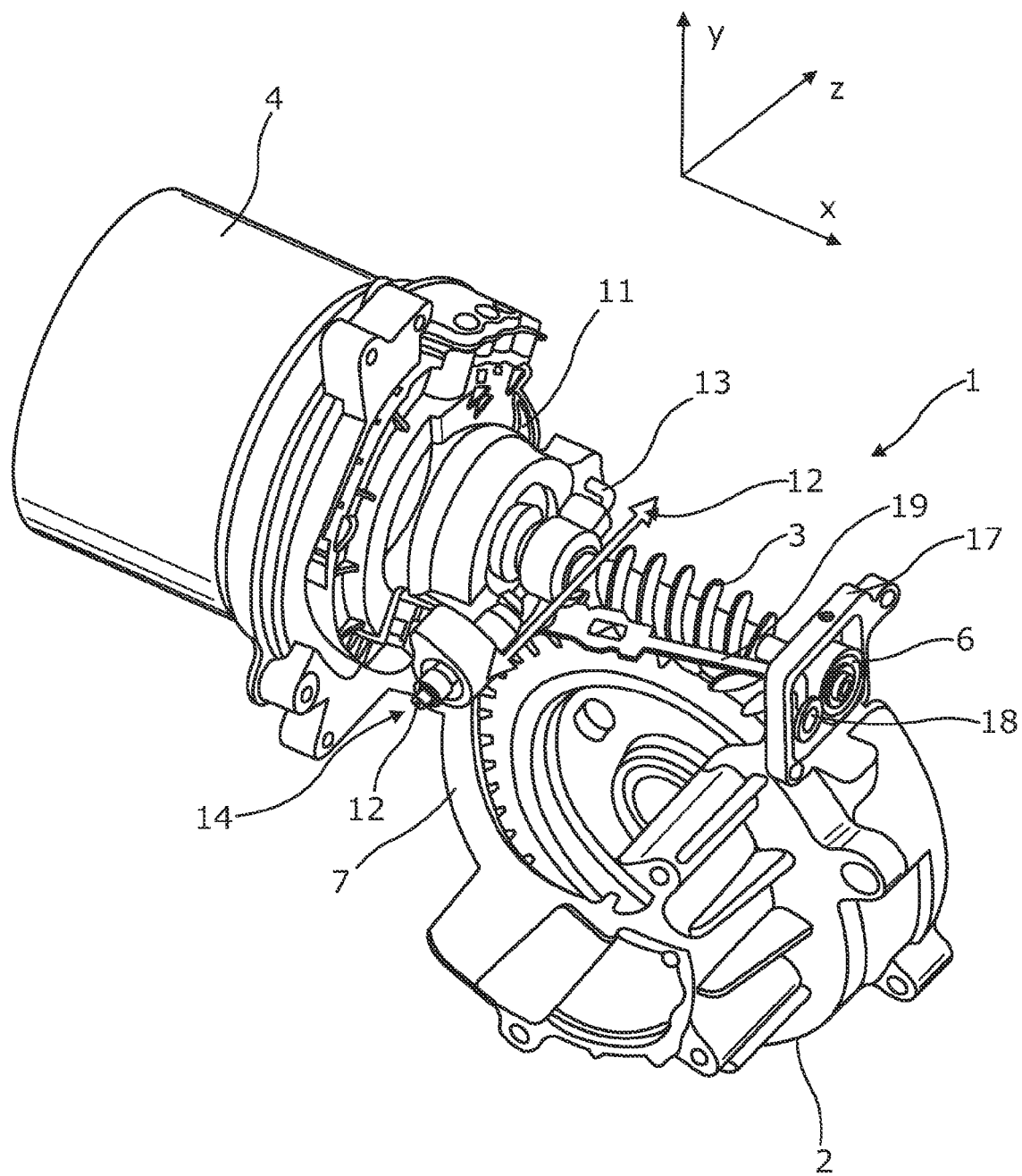
FIG. 2 is an alternative perspective view of the gearbox of FIG. 2.
Figure 3:
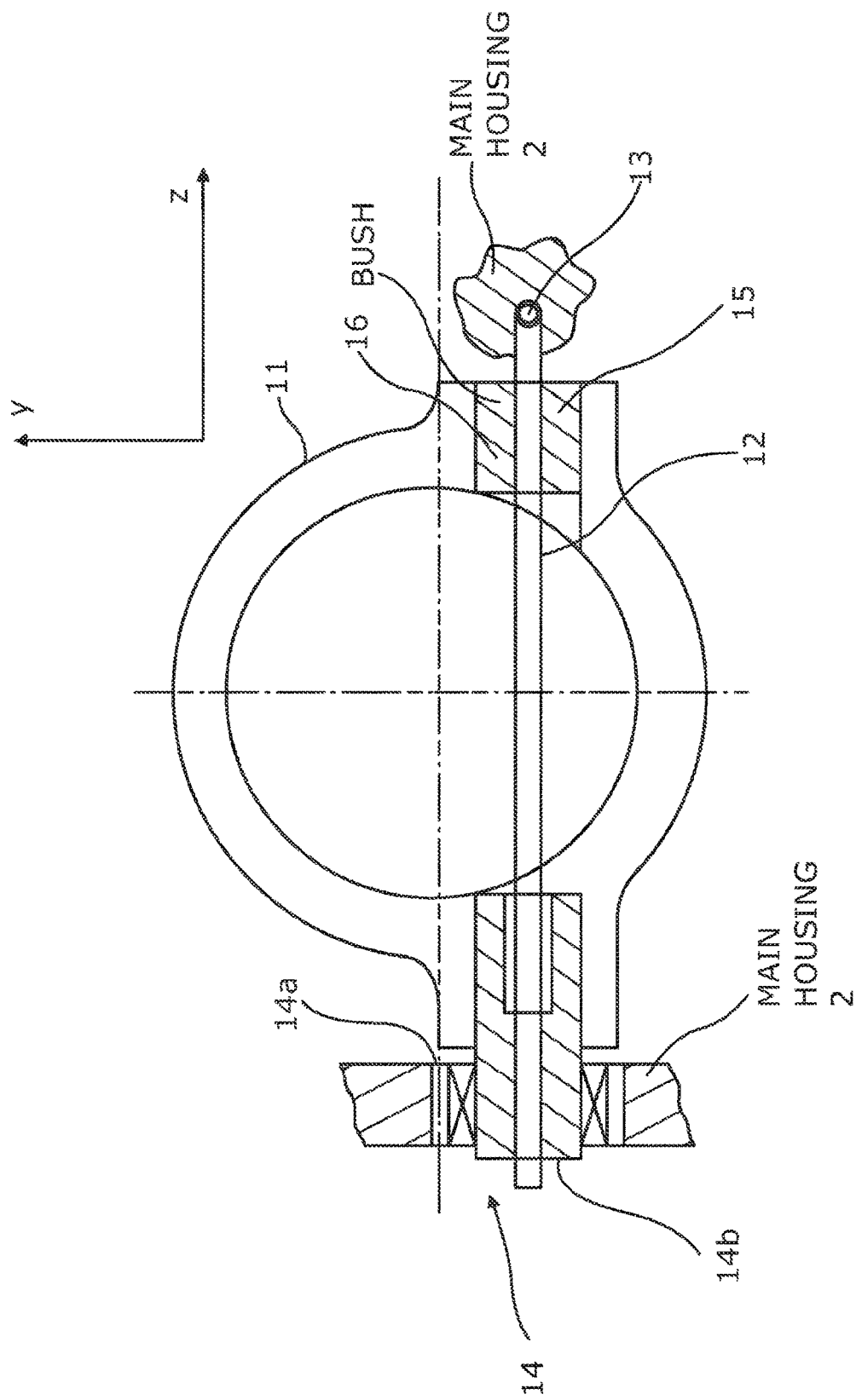
FIG. 3 is a view in cross section of the main bearing assembly carrier and the pivot axle and associated components.

A suitable arrangement for the tail bearing 6 is shown in FIGS. 1 and 2 of the accompanying drawings. A rigid guide plate 17 is fixed to the gearbox housing 2. The plate 17 has a slot within it, the slot defining two generally vertical opposing side walls that define a first guiding surface and a second guiding surface respectively. The surfaces are smooth and face each other across the slot. The slot is closed at both ends. Located between the two side walls are the tail bearing assembly 6 and a guide device in the manner described below.

The guide device comprises a flanged roller 18 of circular cross section, the outer circumferential face of the roller between the flanges engaging one of the side walls that define a guiding surface. The flanges prevent the roller 18 moving axially and the spacing between the flanges is chosen to be slightly greater than the thickness of the plate 17 in the vicinity of the side wall.

The tail bearing assembly 6 comprises an inner race, an outer race and bearings between the races. The tail end of the worm shaft 3 is threaded through the inner race, and the outer circumferential face of the outer race contacts the other side wall of the guide plate 17, i.e., contacts the other guiding surface. Again the outer bearing race may be provided with optional flanges to stop it moving axially or may be constrained by virtue of the inner race being fixed to the worm shaft. The spacing between the walls of the slot is chosen to be less than the sum of the diameters of the contact portions of the roller 18 and outer bearing race so that they contact one another at a single point. The outer bearing race is located closer to the bottom of the slot in this embodiment than the roller 18 is to the bottom of the slot.

A biasing means, in the form of a leaf spring 19, acts between the housing 2 and the tail bearing outer race to bias the tail bearing in towards the gear wheel 7. The spring is a hook-ended leaf spring, which is cantilevered from the screw indicated, presses down on the outer diameter of a roller 18. The hooked end of the anti-rattle spring (ARS) does not contact the outer bearing race directly but instead bears down on the roller 18. This applies a force that presses the roller 18 into contact with the side wall and the outer bearing race, in turn pressing the outer bearing race down towards the base of the slot. The movement of the outer bearing race is opposed by the worm shaft. An optional low friction pad (not shown) is provided between the tip of the spring and the roller.

In use, the worm shaft is guided to move in the plane of the gear wheel by means of the fixed parallel sided slot against one side of which the tail bearing assembly rolls and against the other side of which slot the separate cylinder rolls onto which the spring imposes a force which is substantially parallel to the gear wheel plane. The addition of the roller enables the tail bearing to move along the slot in the plane of the gear wheel with a pure rolling action; i.e. without having to slide on the guiding surface defined by the walls of the guide plate. Furthermore, the tail bearing is very rigidly prevented from moving normal to the gear plane.

As stated the roller 18 in this embodiment has flanges to retain it in the guide plate 17, in the direction of the worm axis. It is important to size the roller 18 so that the inclination, relative to a normal to the gear wheel plane, of the "contact" plane passing through the centres of the roller and the tail bearing assembly is small enough to prevent the side loads acting on the worm shaft from squeezing the roller out of position. The maximum angle allowed is a function of the friction coefficients which exist between the roller 18 and the tail bearing assembly 6 and between the roller 18 and the guide plate 17 and also the force being applied to the roller 18 by the leaf spring 19. On the other hand, the said inclination has to be large enough to prevent the tail bearing and roller from jamming in the guide plate 17. A value of around 5 degrees may be suitable.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A gearbox assembly for an electric power assisted steering apparatus comprising:

a gearbox housing which houses a worm shaft and a gear wheel, the worm shaft being supported relative to the gearbox housing by a main bearing assembly at an end closest to a motor of the steering apparatus and by a tail bearing assembly at an end furthest from the motor, and the gear wheel being supported by an output shaft having at least one end that provides a take-off from the gearbox assembly, in which the tail bearing assembly is free to move relative to the gearbox housing through a limited range of motion that enables the worm shaft to move radially away from an axis of the gear wheel, and further including a biasing means that applies a biasing force to the tail bearing assembly that biases the worm shaft into engagement with the gear wheel, wherein the main bearing assembly comprises an inner race and an outer race separated by bearing elements, the outer race being supported by a carrier that is supported by an axle that is in turn secured to the gearbox housing, the axle defining a pivot axis for the worm shaft that is located on a side of the worm shaft closest to the gear wheel and extends in a direction orthogonal to an axis of the worm shaft and parallel to the axis of the gear wheel, the axle comprising a first portion that is secured to the gearbox housing so that the first portion is free to rotate around the pivot axis but is prevented from moving radially, and further comprising a second portion that is offset along the pivot axis from the first portion and is secured to the gearbox housing in such a way that the second portion is fixed and is prevented from moving axially, rotationally and radially, the first portion and second portion being connected by a third portion that is able to twist when a torsion is applied by the first and second portions whilst restraining relative axial movement of the first and second portions, and further in that a first part of the carrier is fixed to the first portion of the axle so that the first part of the carrier is prevented from rotating relative to the first portion of the axle whereby in use radial movement of the main bearing is constrained by the axle whilst pivoting movement of the carrier about the axle is achieved through twisting of the first portion of the axle relative to the fixed second portion of the axle.

2. The gearbox assembly according to claim 1 further in which a second portion of the carrier is supported by the second portion of the axle so that the carrier is free to rotate relative to the second portion of the axle.

3. The gearbox assembly according to claim 1 in which the axle comprises a single rigid but torsionally flexible shaft, first and second ends of the shaft sharing a common axis of rotation.

4. The gearbox assembly according to claim 3 in which the axle comprises an elongate wire torsion spring with a first portion, a second portion and a third portion thereof comprising spaced portions along the wire.

5. The gearbox assembly according to claim 1 in which the first portion of the axle is located on an opposite side of the gear wheel from the second portion of the axle.

6. The gearbox assembly according to claim 1 in which a first end of the axle is secured to an inner race of a bearing assembly with an outer race of the bearing assembly being secured to the gearbox housing.

7. The gearbox assembly according to claim 1 in which the carrier is fixed to the inner race by press fit of the inner race into a recess in the carrier.

8. The gearbox assembly according to claim 1 in which a second end of the axle comprises a finger that extends radially away from an axis of the axle about which the axle twists and is secured to the gearbox housing.

\* \* \* \* \*